(12) United States Patent
McElligott et al.

(10) Patent No.: US 7,255,433 B2
(45) Date of Patent: Aug. 14, 2007

(54) MULTIPLE PASS AQUEOUS MICR INKJET INK PRINTING

(75) Inventors: Michael J. McElligott, Rochester, NY (US); Thomas W. Martin, Rochester, NY (US); Donald E. Snyder, Jr., Spencerport, NY (US); Dennis M. Lengyel, Hemlock, NY (US); Philip Theodore, Brentwood, TN (US)

(73) Assignee: Nu-Kote International, Inc., Franklin, TN (US)

( * ) Notice: Subject to any disclaimer, the term of this patent is extended or adjusted under 35 U.S.C. 154(b) by 275 days.

(21) Appl. No.: 10/878,861

(22) Filed: Jun. 28, 2004

(65) Prior Publication Data

US 2005/0285918 A1    Dec. 29, 2005

(51) Int. Cl.
*G01D 11/00* (2006.01)
(52) U.S. Cl. ............... 347/100; 106/31.65; 106/31.67; 106/31.66
(58) Field of Classification Search ............... 347/100; 106/31.65, 31.67, 31.66, 457, 460, 480, 479, 106/453, 499
See application file for complete search history.

(56) References Cited

U.S. PATENT DOCUMENTS

| | | | | |
|---|---|---|---|---|
| 5,780,190 A | * | 7/1998 | Listigovers et al. | 430/39 |
| 6,402,308 B1 | * | 6/2002 | Hattori et al. | 347/86 |
| 6,499,839 B1 | * | 12/2002 | Busby et al. | 347/96 |
| 6,505,006 B1 | * | 1/2003 | Solanki et al. | 399/12 |
| 6,561,635 B1 | * | 5/2003 | Wen | 347/85 |
| 6,621,920 B1 | * | 9/2003 | Koike | 382/139 |
| 2001/0004425 A1 | * | 6/2001 | Shinohara et al. | 399/301 |
| 2002/0022120 A1 | * | 2/2002 | Katsuki et al. | 428/195 |
| 2003/0180647 A1 | * | 9/2003 | Patel et al. | 430/137.14 |
| 2005/0095016 A1 | * | 5/2005 | Simpson et al. | 399/12 |

* cited by examiner

*Primary Examiner*—Manish S. Shah
*Assistant Examiner*—Laura E. Martin
(74) *Attorney, Agent, or Firm*—Fay Sharpe LLP

(57) ABSTRACT

The invention relates to a multiple pass printing process for generating MICR-readable indicia using a MICR ink-jet ink composition with a magnetic pigment loading less than that needed to generate the nominal signal level according to the ANSI standard with single pass printing, and to a printed substrate, prepared by the process, which bears MICR-readable indicia having at least two layers of the MICR ink-jet ink composition and which demonstrates a MICR signal level of greater than or equal to the nominal signal value according to the ANSI standard.

30 Claims, No Drawings

MULTIPLE PASS AQUEOUS MICR INKJET INK PRINTING

BACKGROUND OF THE INVENTION

The invention relates to ink-jet ink compositions suited for use in the printing of magnetic ink character recognition, or MICR, documents. More particularly, the invention relates to a process of printing such documents using a MICR-readable inkjet ink composition.

Inks suited for use in printing MICR-readable documents are known. Such inks are generally employed in the printing and preparation of security documents, or documents that require a secure feature, such as checks. Conventional ink-jet inks contain a dye or pigment, a solvent system, which may be aqueous or non-aqueous in nature, and may include a combination of solvents or a single solvent, and various other components, included to address specific problems relating to ink performance, such as toner flow characteristics, the ink drying out over time as it sits in the cartridge or when it is deposited on the nozzle during printing, particulate matter in the ink settling out of solution over time, etc. Some well known additives used to control these parameters include humectants, surfactants, dispersion aides, biocides, and others. The amount of additive and the type used are dictated predominantly by the print engine for which the ink is being prepared, the intended use of the ink-jet ink, and the effect, if any, that each component may have on the performance of each other component.

Of particular interest in this instance are those inks which contain a magnetic pigment or component in an amount sufficient to generate a magnetic signal strong enough to be MICR-readable. Such inks generally fall into the category of magnetic inks in general, and in the more specific subcategory of MICR-readable inks. Generally the ink is used to print all or a portion of a document, such as checks, bonds, security cards, etc. For example, most checks exhibit an identification code area, usually at the bottom of the check. The characters of this identification code are usually MICR encoded. The document may be printed with a combination of MICR-readable ink and conventional ink, or with just MICR-readable ink. The document thus printed is then exposed to an appropriate source or field of magnetization, at which time the magnetic particles become aligned as they accept and retain a magnetic signal. The document can then be authenticated by passing it through a reader device which detects the magnetic signal of the MICR imprinted characters, or "reads" the signal, in order to authenticate or validate the document. Of particular importance in the foregoing is the ability of the magnetic component of the ink to retain a sufficient charge such that the printed characters retain their readable characteristic and are easily detected by the detection device or reader. The magnetic charge retained by the pigment or magnetic component is known as "remanence". As might be expected, this characteristic tends to increase with particle size and with the density of the coating of the magnetic pigment.

In the past, thermal ribbon printing mechanisms were used to generate MICR-readable characters or indicia. In this printing technique the particle size and density of the magnetic pigment or particulate was not a limiting factor because the magnetic component was retained on a ribbon substrate by a binder and/or wax material. Then, upon application of heat and pressure the magnetic ink was transferred to a substrate. However, the incorporation of such magnetic pigments or particulates into an aqueous, or a non-aqueous, liquid ink presents a new set of considerations. For example, the pigment, which had generally previously been used in the form of pigment or particulate matter of a larger size, and thus exhibited a correspondingly high density, is difficult to maintain in suspension or dispersion within a liquid ink composition. Consequently, it became necessary to reduce the particle size of the magnetic pigment or particulate. However, with a reduction in particle size came a corresponding reduction in magnetic charge or remanence. In addition to the foregoing, one wishing to prepare a liquid MICR inkjet ink must also take into consideration the fact that most, if not all, inkjet printers limit considerably the particle size of any particulate components of the ink, due to the very small size of the inkjet print head nozzle which expels the ink onto the substrate. Problems such as the foregoing required resolution before a suitable MICR-readable inkjet ink could be formulated.

These problems have been addressed in several different ways. For example, U.S. Ser. No. 10/186,492, assigned to our common assignee, discloses the use of a combination of surfactants, in conjunction with a very small particle size metal oxide component, to maintain a useful suspension or dispersion of the magnetic component within the ink composition. The ink disclosed in this application, while it contains a significant amount of metal oxide, nonetheless retains the same in suspension and is then suitable for MICR printing applications. Another means of achieving an ink-jet ink suitable for use in ink-jet printers, and also for generating MICR-readable print, is to coat the metal oxide with a specific hydrophilic coating to help retain the particulate metal oxide magnetic pigment in suspension.

The foregoing methods successfully achieve the desired result, i.e., an ink-jet ink with particulate matter small enough to be efficiently ejected through the ink-jet nozzle, and yet present in an amount sufficient to generate a strong enough signal that the printed document is MICR-readable. However, additional ink components are in each case necessary to this achievement. It has remained for the subject inventors to develop a printing method that achieves the same strong magnetic signal, suitable for MICR applications, and that does so with a reduced magnetic pigment or particulate loading and without any special additives to retain the particulates in suspension.

SUMMARY OF THE INVENTION

The challenges of formulating a suitable ink-jet ink for use in MICR printing applications revolve around the need to achieve an ink composition containing very small particle size magnetic material, due to the size of the ink-jet print head nozzles, and yet maintain the necessary level of remanence, or magnetic signal output of the particulate matter, such that the MICR-readable characteristic of the ink is not compromised. The invention relates to a means of achieving the foregoing challenge.

DETAILED DESCRIPTION OF THE INVENTION

The invention relates to a process of printing a MICR-readable document, using any type of ink-jet printer. As used herein, the term "document" is intended to include any substrate which is rendered MICR-readable by having printed thereon one or more characters or indicia with a MICR ink-jet ink composition. Of special interest is the use of a magnetic ink exhibiting the capability to print MICR-readable indicia even though the magnetic pigment loading in the ink-jet ink composition may be lower than previously deemed necessary in the relevant field of art. Use of the term "indicia" is intended to mean any printed image, including one or more letters, numbers, symbols, punctuation marks, pictures, figures and the like, and any combination thereof.

Of further interest is the ability of the ink-jet ink composition having reduced magnetic pigment loading to retain the magnetic pigment in suspension for extended periods of time, thus extending the shelf-life of the ink and the period of time that the ink may sit idle in the printer without clogging the print head nozzles.

One ink-jet ink composition that meets the foregoing criteria includes a magnetic pigment dispersion, i.e., a dispersion containing the magnetic pigment component and at least an aqueous solvent, though other components may also be included. Such other components may include one or more surfactants, thickening agents, buffering agents, surface tension modifiers and other additives that aid in producing a stable, magnetic dispersion. The magnetic pigment dispersion may then be combined with an ink-jet ink composition suitable for use in ink-jet printers.

Magnetic pigments or particulate matter used in conventional MICR transfer application coatings typically exhibit a size of 2.0 microns or larger. Such coatings generally consist of a dried film, usually supported on a ribbon. The film may comprise the magnetic particulate matter, solvent, one or more binder materials, and other optional additives, including a release agent, such as an oil or wax component. The magnetic pigment or particulate is held in the dried binder matrix after the solvent is evaporated off. Therefore, problems associated with the dispersion of larger particulates, such as settling, are not an issue. In addition, larger particles tend to generate a stronger magnetic signal, thus reducing the amount of pigment needed to achieve printing of a MICR-readable document. Such dried compositions are then used in thermal transfer or impact applications.

Ink-jet ink processing, however, requires the use of liquid ink compositions, far removed in nature and character from the dry compositions used in heretofore conventional impact or thermal transfer applications. Because iron oxide has a specific gravity of approximately 7 it has a natural tendency to settle to the bottom of a fluid ink composition, resulting in a non-homogenous fluid having an iron oxide rich lower layer and an iron oxide deficient upper layer. Therefore, a main challenge in developing MICR ink-jet ink is keeping the iron oxide homogeneously suspended in the fluid ink composition, and to have the size of the iron oxide particles small enough to pass through the orifices of an ink-jet print head. Further, the ink-jet ink composition used for printing with an ink-jet printer must be formulated with the parameters of the equipment in mind. Such parameters include the very small nozzles of the ink-jet print head, generally on the order of about 40 to 50 microns, but some being less than 10 microns in size. This small nozzle size dictates that the particulate matter contained in any ink-jet ink composition intended for use in such a printer must necessarily be of a very small particle size in order to avoid nozzle clogging problems. In addition, the particulate matter must be stable in suspension in the liquid ink composition, which may be aqueous in nature, and not be prone to settling over time. The particles, although smaller in size than the nozzle, can also agglomerate, or cluster together, to the extent that the size of the agglomerate exceeds the size of the nozzle resulting in the nozzle being blocked. Additionally, the particulate matter may be deposited in the nozzle during printing, forming a crust that results in nozzle blockage and/or imperfect flow parameters. The use of smaller particle size materials allows for the ink-jet ink composition to more easily meet the foregoing criteria, and avoid the problems just mentioned, among others.

Unfortunately, commercially available oxides do not normally meet the requirements for ink-jet applications. Generally they do not exhibit the right combination of properties. Oxides suitable for ink-jet applications must be extremely fine in particle size without experiencing the usual loss of magnetic properties inherent in size reduction of magnetic particulate matter. Suitable ink-jet oxides must also be hydrophilic in nature in order to provide good dispersion characteristics, and to provide good emulsion properties. The latter parameters relate directly to the ability of the oxide to exhibit minimum settling and to further demonstrate the proper wetting of the oxide with the other water-soluble ingredients generally present in an ink-jet ink composition.

In addition to the foregoing, when the ink-jet ink is intended for use in printing MICR-readable documents, another important consideration must be addressed. Specifically, the magnetic particulate material must exhibit sufficient remanence, once exposed to a source of magnetization, to generate a MICR-readable signal and have the capability to retain the same over time. Unfortunately, along with the necessary reduction in particle size dictated by the parameters of the ink-jet print equipment, the magnetic particles tend to experience a corresponding reduction in remanence. Achieving sufficient signal strength becomes increasingly difficult as the metal oxide particle size diminishes and the practical limits on percent content of metal oxide in the ink composition are reached. The magnetic property that is believed to be the most important is remanence, which should be at least a minimum of 25 emu/g. The higher the remanence value the stronger the readable signal. A higher value will require less total % iron oxide in the ink formula and will improve the suspension properties, or in the converse reduce the likelihood of settling over an ink formula with higher % iron oxide content.

Until now, it has been thought that the most efficient means to achieving sufficient remanence while reducing the particle size was to increase the magnetic particulate loading. However, this approach tends toward causing problems with regard to retention of the particulate matter in suspension in the ink-jet ink composition, i.e., inks with increased particulate loading experience settling problems to a greater degree than ink-jet inks with lesser particulate loading. As was discussed earlier, several means to address this problem have been proposed, including the use of one or more surfactants in the magnetic material pre-dispersion, the use of specially coated magnetic particulate materials, and the processing used to formulate the magnetic oxide dispersion prior to addition to the ink-jet ink composition. Such methods are set forth in the disclosures of U.S. Ser. No. 10/186, 492 and U.S. Ser. No. 10/186,440, to our common assignee, the disclosures of both applications being incorporated herein by reference.

MICR ink-jet ink must also exhibit low viscosity, typically on the order of less than about 15 cP and more preferably on the order of about 2-8cP, in order to function properly in both drop-on-demand type printing equipment, such as thermal bubble jet printers and piezoelectric printers, and continuous type print mechanisms. The use of low viscosity fluids, however, adds to the concerns of successfully incorporating iron oxides into the ink dispersion because particle settling will increase in a low viscosity, thinner fluid as compared to a more viscous, thicker fluid.

This invention proposes a novel method for addressing the foregoing problems. In particular, a method is proposed for printing MICR-readable documents using full color process printing systems. By "full color process" is meant printing systems suitable for use in rendering full color print images. Full color process printing utilizes cyan, magenta and yellow subtractive primaries to produce all colors. By definition, such systems employ either a series of ink cartridges, each one designated for a particular color of ink, including black, or a multiple chambered cartridge, wherein each chamber houses a different color of ink, typically cyan, magenta and yellow. If the latter is used, a separate single chamber black ink cartridge can be employed along side the color ink-containing cartridge, though the black ink may be housed in the same cartridge as the color inks. This type of full color process printing is accomplished by multiple passes of the print head, each time ejecting a different color of ink in order to gain an additive affect, creating full color images with various shades and hues of color.

The method disclosed herein takes full advantage of the benefits of full color process printing. In particular, the method employs the multiple pass operation of the full color process printing system to eject and lay down multiple layers of ink, but of only one color. In the case of most MICR printing applications, the ink used is black, though color inks may be used as well. In actuality, the subject method is more likely to suit the printing of color MICR inks, as will be explained hereafter.

In one embodiment of the invention, the multiple chambers of the ink-jet ink cartridge are in each case filled with a MICR ink of the same formulation, and of the same color, i.e. the same ink. As has been previously pointed out, that color is usually black, though other colors may be employed. For purposes of this disclosure, it is to be understood that while black is the color most often referred to, the processing parameters presented are equally applicable to the use of color ink-jet inks. The chambers of the ink-jet cartridge may be filled with the same ink, i.e., each chamber would hold the same ink-jet ink formulation. As the printer's print head makes multiple passes, as it would with any full color process printing run, the same ink is ejected and laid down creating the desired indicia. By this method, the magnetic pigment available in the printed indicia for generating the necessary MICR-readable signal is doubled, tripled, quadrupled, etc., depending on how many chambers of the print head have been filled with the ink-jet ink containing the magnetic pigment and how many passes are printed, or layers are deposited.

In another embodiment of the invention, ink-jet inks having different magnetic pigment loading levels are charged to each chamber of the cartridge, or are used for each pass of the print head. This would allow the user to achieve a tailored signal performance.

In yet another embodiment of the invention, cyan, magenta and yellow inks, or any combination thereof, each with a magnetic pigment or particulate loading as described herein, are used in the process to generate full color indicia that is MICR-readable.

By way of example, a MICR ink-jet ink was prepared. The ink contained a magnetic iron oxide pigment dispersion combined with a conventional pigmented inkjet black ink. The iron oxide dispersion contained those components as listed in Table I below for the MICR Iron Oxide Dispersion. The dispersion was made by adding the surfactants to water with high speed mixing. The iron oxide was then added, also with high speed mixing, and the resulting dispersion was subsequently ball milled for a period of time to reduce the particle size of the iron oxide.

TABLE 1

| MICR Ion Oxide Dispersion | % | % Solids Wet | Dry at 100% Basis |
|---|---|---|---|
| Coated Iron Oxide Wet Cake 58.2% in Water | 51.40 | 29.91 | 90.89 |
| Distilled water | 45.60 | 0.00 | 0.00 |
| Surfonyl 324CT (surfactant) | 1.50 | 1.50 | 4.56 |
| Tamol 731A (surfactant) | 1.50 | 1.50 | 4.56 |
| Total | 100.00 | | 100.00 |
| % Solids | | 32.91 | |

In addition, a non-magnetic Pigmented Black Ink, containing 2-pyrrolidone, 1,5-pentanediol, Surfynol 465 surfactant, Cabojet 300 black pigment, Proxel GXL biocide, and water was prepared by conventional mixing techniques according to the formulation shown in Table 2. The MICR Iron Oxide Dispersion from Table 1, along with urea as an anti-crusting agent, was added with stirring to the Pigmented Black Ink of Table 2 to form a MICR Inkjet Ink. The MICR Inkjet Ink thus prepared was then passed through a series of filters, the smallest as small as 3 microns, to form the finished ink.

TABLE 2

| | | | MICR Inkjet Ink | | |
|---|---|---|---|---|---|
| MICR Inkjet Inks | Black Pigment Ink % | Black Pigment Ink % Solids Wet | % | % Solids Wet | Dry at 100% Basis |
| Urea | | | 4.00 | 4.00 | 13.56 |
| MICR Iron Oxide Dispersion (Table 1) | | | 50.00 | 16.46 | 55.80 |
| Pigmented Black Ink: | | | 35.00 | | |
| 2-pyrollidone | 18.73 | 18.73 | | 6.56 | 22.23 |
| 1,5-pentanediol | 3.32 | 3.32 | | 1.16 | 3.94 |
| Surfynol 465 | 0.09 | 0.09 | | 0.03 | 0.11 |
| Cabojet 300 (15.1% carbon black in water) | 23.82 | 3.60 | | 1.26 | 4.27 |
| Proxel GXL (biocide) | 0.08 | 0.08 | | 0.03 | 0.09 |
| deionized water | 53.96 | 0.00 | 11.00 | 0.00 | 0.00 |
| Total | 100.00 | | 100.00 | | 100.00 |
| % Solids | | 25.82 | | 29.49 | |
| % Pigment (Oxide + C) | | 3.60 | | 17.72 | |
| % Oxide | | 0.00 | | 16.46 | |

The MICR Inkjet Ink prepared above was charged to each chamber of a multiple chamber cartridge. The cartridge was then installed in an Olivetti Jet Lab 400 printer, and the machine was operated in the single pass mode, and then in the multiple pass mode. In the multiple pass mode the printer operated to generate three passes, or three layers, from the multiple chamber cartridge. Shown below are the results of signal strength as read by an RDM GTX MICR Analyzer reader. The single pass signal data represents one layer of ink, while the triple pass signal data represents the signal generated by indicia having three ink layers, in this instance all layers being of the identical ink. Each run (Run 1, Run 2, and Run 3) represents the printing of two checks which were both printed with the same E13B ANSI MICR characters or indicia. The numerical value listed is the Average Nominal Signal Level for all the characters printed. The first value reported is the Average Nominal Signal Level of the first check document which was printed. The second number, after the slash (/), is the Average Nominal Signal Level of the second check document printed. The difference in the run conditions (Run 1, Run 2, and Run 3) are density and contrast settings which were applied to the individual printer software and the printhead orientation (horizontal or vertical) to the printing plane while printing. Several runs are reported with varying printer settings for each run in Table 3 below.

TABLE 3

|       | SINGLE PASS | TRIPLE PASS |
|-------|-------------|-------------|
| RUN 1 | 77/76       | 180/161     |
| RUN 2 | 55/56       | 177/175     |
| RUN 3 | 115/116     | 348/347     |

Run 1 used a cartridge design with high print quality, −25 brightness and +50 contrast settings in the printer driver, and a horizontal printhead orientation. Run 2 used the same cartridge design as Run 1, but with the exception of using normal print quality drive setting instead of high print quality driver setting. Other parameters were the same as Run 1 (, −25 brightness and +50 contrast settings in the printer driver, and a horizontal printhead orientation). Run 3 used the same cartridge design as Run 1 (high print quality, −25 brightness and +50 contrast settings in the printer driver), with the exception that the printhead was in a vertical (downward) position instead of a horizontal orientation.

It was determined from the foregoing that the signal level was increased due to each of the following factors: multiple pass instead of single pass printing; operating the printer with the printhead in a downward or vertical orientation; operating the printer on high print quality and high contrast (+50) printer driver settings; and operating the printer on low or negative (−25) brightness printer driver settings.

There is a clear jump in signal level shown in each pairing of ink runs. In Run 1, the signal level generated by indicia resulting from the triple pass setting was almost 2 ½ times the signal strength generated by indicia resulting from the single pass printing for that same run. In Runs 2 and 3, the triple pass sample generated a signal strength approximately 3 times that of the single pass sample.

From this data, the inventors have been further able to determine that one means of addressing the problem of pigment loading versus achieving a sufficient signal level would be to reduce the amount of pigment in a given aliquot of ink, for instance by ½ or even ⅔, and use the multiple pass system of printing to nonetheless achieve deposition of the necessary amount of pigment to generate a MICR-readable signal. Each individual layer, therefore, need not contain enough magnetic pigment or particulate matter to generate the necessary signal alone. The magnetic pigment or particulate matter loading of the ink-jet ink can be reduced to the point where the additive effect of the number of layers printed is enough to generate a readable signal.

A reduction in the amount of magnetic pigment needed to generate the necessary signal may also create benefits in several other aspects of the MICR ink-jet ink. For example, magnetic pigments tend to be dark in color, thus hampering the formulation of color MICR ink-jet inks for use in ink-jet ink systems. The dark, often black color of the pigment generally renders the MICR ink black. However, with a lower pigment loading, and small particle size magnetic pigment, it is possible to produce some color inks suitable as MICR-readable inks. Of greater benefit is the ability to eliminate or reduce greatly the problem of pigment settling.

In addition, as one might expect, it is often times not necessary to render an entire document MICR-readable. An example is a check, where only the lower portion of the document bears MICR characters. Another example would be billing statements that have tear-away sections for remittance with payment. This portion of the document often contains MICR-readable indicia. In those instances where only a portion of a document requires printing of a non-security feature, a single pass of the cartridge may be used, while using the multiple pass option for the printing of that portion of the document which requires the presence of MICR-readable indicia. This would greatly reduce the current problem of printing different areas of the same document from different machines, or in different print runs.

The multi-pass aqueous MICR ink-jet inks and the method of use shown herein provides a means to achieve both a reduction in particle size employed and a reduction in % loading without jeopardizing the ink's MICR performance. The following MICR inkjet ink formulations were prepared as exemplary inks to illustrate these advantages.

EXAMPLE 1

In this Example 1, as shown in Table 4, a MICR inkjet ink formulation was prepared in accord with the processing set forth hereinabove. An iron oxide dispersion was prepared by combining the surfactants and the water with stirring, and then adding the oxide component with continued stirring, until the iron oxide particulate was fully and homogeneously dispersed in the aqueous medium. This MICR Iron Oxide Dispersion was then milled to a smaller particle size and added, along with urea, to a non-magnetic Pigmented Ink composition. The Pigmented Ink composition was prepared by combining in a high speed mixer the following components in the amounts set forth in Table 4: 2-pyrrolidone; 1,5-pentanediol; an acetylene surfactant; black pigment, at 15.1% in water; a biocide component; and deionized water. As with the MICR Iron Oxide Dispersion, the foregoing components had been thoroughly mixed to create a homogeneous aqueous inkjet ink. The inkjet ink was then passed through a series of filters, of 10 microns, 6 microns, and 3 microns, to remove any remaining larger particles. This inkjet ink formulation would, of itself, provide good to excellent print quality. For the purposes of this and the following examples, however, to this non-magnetic, Pigmented Inkjet Ink formulation was added the MICR Iron Oxide Dispersion and urea, thus rendering the inkjet ink potentially MICR readable.

EXAMPLE 2

In this Example 2, a MICR inkjet ink formulation was prepared in keeping with the processing used in Example 1, except that the amount of MICR Iron Oxide Dispersion used was ½ the amount used in Example 1. The remaining components were as listed in Table 4, and in the amounts shown therein.

EXAMPLE 3

In this Example 3, a MICR inkjet ink formulation was once again prepared in keeping with the parameters set forth in the previous Examples, except that the amount of MICR Iron Oxide Dispersion used in this Example was only ⅓ of the amount used in Example 1. The remaining inkjet ink components were those set forth in Table 4, used in the amounts shown therein.

read, by an industry standard MICR-reading device. The data recorded indicates the strength of the signal read for each sample by the RDM GTX MICR Analyzer Reader.

TABLE 4

| INKJET INK COMPONENTS | EX. 1 % COMP. | EX. 1 INK % SOLIDS WET | EX. 1 DRY AT 100% BASIS | EX. 2 % COMP. | EX. 2 INK % SOLIDS WET | EX. 2 DRY AT 100% BASIS | EX. 3 % COMP. | EX. 3 INK % SOLIDS WET | EX. 3 DRY AT 100% BASIS |
|---|---|---|---|---|---|---|---|---|---|
| Iron Oxide Dispersion | 50.00 | 14.20 | 52.14 | 25.00 | 7.10 | 26.70 | 16.00 | 4.54 | 17.24 |
| Urea | 4.00 | 4.00 | 14.69 | 4.00 | 4.00 | 15.04 | 4.00 | 4.00 | 15.18 |
| Pigmented Ink: | 35.00 | | | 60.00 | | | 69.00 | | |
| 2-Pyrrolidone | | 6.56 | 24.07 | | 11.24 | 42.26 | | 12.92 | 49.03 |
| 1,5-Pentanediol | | 1.16 | 4.27 | | 1.99 | 7.49 | | 2.29 | 8.69 |
| Surfynol 465 | | 0.03 | 0.12 | | 0.05 | 0.20 | | 0.06 | 0.24 |
| Cabojet 300 (15.1% C.B. in water) | | 1.26 | 4.62 | | 2.16 | 8.12 | | 2.48 | 9.42 |
| Proxol GXL | | 0.03 | 0.10 | | 0.05 | 0.18 | | 0.06 | 0.21 |
| Deionized Water | 11.00 | 0.00 | 0.00 | 11.00 | 0.00 | 0.00 | 11.00 | 0.00 | 0.00 |
| Total | 100.00 | | | 100.00 | 100.00 | | 100.00 | 100.00 | 100.00 |
| % Solids | | 27.24 | | | 26.59 | | | 26.36 | |
| % Pigment (Oxide + Carbon Black) | | 15.46 | | | 9.26 | | | 7.03 | |
| % Oxide | | 14.20 | 47.55 | | 7.10 | 24.35 | | 4.54 | 15.72 |
| Surface Tension* dynes/cm at 21° C. | | | 44 | | | 52 | | | 49 |
| Viscosity** cP at 21° C. | | | 6.63 | | | 3.10 | | | 1.90 |
| Conductivity*** µs at 21° C. | | | 710 | | | 490 | | | 440 |
| pH at 21° C.**** | | | 7.63 | | | 7.46 | | | 7.21 |

*Measured using the Fisher Surface Tensiomat 21
**Measured using the Brookfield DV-IIT Viscometer, with UL adapter at 60 RPM's
***Measured using the Omega PHH-80 Conductivity Meter
****Measured using the Omega PHH-80 pH Meter Generally, an acceptable level of charge, as set by industry standards, is between 50 and 200 Signal Level Units with 100 being the nominal value which is defined from a standard developed by ANSI (the American National Standards Institute). A lesser signal may not be detected by the MICR reading device, and a greater signal may also not give an accurate reading. Because the documents being read employ the MICR printed characters as a means of authenticating or validating the presented document, it is imperative that the MICR characters or other indicia be accurately read, without skipping or mis-reading any characters.

It is apparent from looking at the data presented in Table 4 with regard to the ink parameters that the viscosity of the ink decreased correspondingly to the reduction in iron oxide pigment content. Conductivity also decreased. Surface tension increased due to the increase in water content. The pH of the inks remained fairly constant and stable.

Table 5 below sets forth the data collected after charging the inks, constituted as set forth in Examples 1, 2, and 3 above, to inkjet ink cartridges and operating the printer to generate MICR characters. As with the previous print runs referred to above, the inks were charged to multiple chamber cartridges, which were installed into an Olivetti Jet Lab 400 printer. The printer was operated to deposit multiple layers of ink, specifically three. The printed characters were subjected to a course of magnetization and then analyzed, or

TABLE 5

| | EX. 1 Full Loading Triple Pass | EX. 2 ½ Loading Triple Pass | EX. 3 ⅓ Loading Triple Pass |
|---|---|---|---|
| RUN 1 | 210/223/216/218 | 136/132/126/129 | 70/68/69/65 |
| RUN 2 | 189/193/193/200 | 143/146/145/153 | 31/30/28/31 |

Run 1 and Run 2 used the same cartridge design and the same printer settings (high print quality, −25 brightness, and +50 contrast settings in the printer driver), with the printhead in a vertical or downward orientation. Run 2 is a repeat experiment of Run 1.

Each Run represents the printing of 4 checks which are printed with the same E13B ANSI MICR characters. The numerical value listed is the Average Nominal Signal Level for all characters printed on a given check. The first value reported is the Average Nominal Sign Level of the first check document which was printed. The second number after the slash (/) is the Average Nominal Signal Level of the second check document printed, and so forth.

Table 5 shows that an inkjet ink having a reduced amount of magnetic pigment, as in Example 2, gave a Signal Level more near the nominal value of 100 per the ANSI specifications. The advantage of reduced oxide loadings in a multi-pass printing process is that the ink is less prone to settle because of the lower content of magnetic pigment. The additive process of the triple pass printing as shown in Example 2 of the inkjet ink which had ½ of the magnetic pigment loading of Example 1 yielded a Signal Level above the nominal value of 100 and well within the upper specification limit of 200 per the ANSI specifications.

Example 1, which had a full magnetic pigment loading yielded a Signal Level that exceeded the upper ANSI specification of 200. The disadvantage of this situation is that at full loading the magnetic pigment has more of a tendency to settle than in those inkjet inks having lower pigment loadings.

Example 3, which had only ⅓ of the magnetic pigment loading yielded a Signal Level lower than Examples 1 and 2, below the nominal value of 100. However, the values were still above the lower specification limit of 50.

The foregoing clearly demonstrates the advantages to be gained by using a reduced iron oxide or pigment loading level in conjunction with a multi-pass printing scheme. The settling and clogging problems of dense oxide-pigmented inks are overcome without the need for additional components or special processing. In addition, smaller particle size oxides can be used without suffering a corresponding loss of MICR-readable signal. Any combination of passes may be used to suit a specific signal strength need. Finally, it is contemplated that color MICR inks may be readily manufactured or prepared given that the black pigment loading can be greatly reduced.

What we claim is:

1. An ink-jet printing method for generating MICR-readable indicia comprising:
   a. preparing MICR ink-jet ink containing a magnetic particulate material in an amount sufficient to generate a minimally readable MICR signal level of lower than the nominal signal value of 100 according to the standard signal level specification defined by ANSI when printed in single pass mode;
   b. charging the MICR ink-jet ink containing the magnetic particulate material to a multiple-chamber ink-jet ink cartridge such that each charged chamber of the cartridge contains the same MICR ink-jet ink composition;
   c. installing the multiple chamber ink-jet ink cartridge in a full color process printer;
   d. operating the printer in a multiple pass manner to print indicia having multiple layers of MICR ink-jet ink;
   wherein the multiple layers of MICR ink-jet ink produce an additive effect with regard to the magnetic signal generated by the printed indicia such that the signal strength is increased in a manner corresponding to the number of layers of the MICR ink-jet ink which have been printed, as compared to the signal strength generated by indicia printed with a single pass of the same ink.

2. The ink-jet printing method of claim 1 wherein the multiple-layer indicia generates a MICR signal level of from about 100 to about 200.

3. The ink-jet printing method of claim 1 wherein the MICR ink-jet ink comprises at least a magnetic iron oxide and an ink.

4. The ink-jet printing method of claim 3 wherein the magnetic iron oxide is contained in a dispersion comprising at least the magnetic iron oxide, water and a surfactant.

5. The ink-jet printing method of claim 4 wherein the dispersion is further combined with a non-magnetic ink-jet ink composition.

6. The ink-jet printing method of claim 1 wherein the MICR ink-jet ink contains at least 10% but not greater than 30% magnetic oxide, based on 100% of the MICR ink-jet ink composition.

7. A method of printing MICR-readable indicia capable of generating a MICR signal value of from 100 to 200, according to ANSI specifications, from ink-jet ink that has a minimal magnetic pigment content, comprising charging a MICR ink-jet ink containing at least 10% but not greater than 30% magnetic oxide, based on 100% of the MICR ink-jet ink composition, to at least two chambers of a multiple-chamber ink-jet ink cartridge, installing the cartridge in a full color process printer, and operating the printer to eject the MICR ink-jet ink from the cartridge chambers to print indicia, such that the number of layers of ink in the printed indicia is equal to the number of chambers in the cartridge that contain the MICR ink-jet ink, wherein the printed indicia generates an ANSI MICR signal strength value increase equal to approximately the number of layers of ink deposited times the signal strength value of a single layer of the same MICR ink-jet ink.

8. The method of claim 7 wherein the MICR ink-jet ink is charged to all chambers of the multiple-chamber ink-jet ink cartridge.

9. The method of claim 7 wherein the printed indicia generates an ANSI MICR signal strength of from about 100 to about 200.

10. The method of claim 7 wherein the MICR ink-jet ink, if printed in a single pass mode, generates an ANSI MICR signal strength value of less than 100.

11. The method of claim 7 wherein the MICR ink-jet ink, if printed in a single pass mode, generates an ANSI MICR signal strength value of less than 80.

12. The method of claim 7 wherein the MICR ink-jet ink contains not less than 15% but not greater than 25% magnetic oxide, based on 100% of the MICR ink-jet ink composition.

13. A MICR-readable document comprising a substrate having printed thereon indicia capable of generating a MICR signal of greater than or equal to the nominal value according to the ANSI standard for the same, the indicia comprising at least two layers of a MICR ink-jet ink composition wherein each layer alone is only capable of generating a MICR signal of less than the nominal value according to the ANSI standard for the same, but wherein the additive effect of the layers generates a MICR signal of greater than or equal to the nominal signal value according to the ANSI standard for the same.

14. The MICR-readable document of claim 13 wherein the MICR signal generated by the indicia is between about 100 and about 200.

15. The MICR-readable document of claim 13 wherein each layer of the indicia alone generates a MICR signal of nut greater than 80.

16. The MICR-readable document of claim 13 also comprising indicia printed with only a single layer of ink-jet ink, such that a portion of the document is MICR-readable and the remaining portion of the document generates a MICR signal below 80.

17. The MICR-readable document of claim 13 wherein the indicia appears to be black.

18. The MICR-readable document of claim 13 wherein the indicia is printed in one or more colors.

19. A MICR ink-jet ink composition comprising at least a magnetic iron oxide dispersion and a liquid ink-jet ink, wherein the magnetic iron oxide is present in the liquid ink composition in an amount less than that necessary to generate a nominal MICR signal value of 100, as defined by ANSI specifications and wherein the liquid ink, when printed in two or more layers exhibits an additive effect with regard to the MICR signal of the layers such that the layers together generate a MICR signal of greater than or equal to the nominal signal value according to the ANSI standard for the same.

20. The MICR ink-jet ink composition of claim 19, wherein the magnetic iron oxide dispersion comprises at least iron oxide and water.

21. The MICR ink-jet ink composition of claim 19, wherein the magnetic iron oxide dispersion comprises iron oxide, water and a surfactant.

22. The MICR ink-jet ink composition of claim 19, wherein the MICR ink-jet ink contains urea.

23. The MICR ink-jet ink composition of claim 19, wherein the ink-jet ink is a pigment-based ink.

24. An ink-jet printing method for printing MICR-readable indicia comprising:
 a) charging at least two chambers of a multiple-chamber ink-jet ink cartridge with a MICR ink-jet ink capable of generating a MICR-readable signal; and
 b) operating a printer in which the multiple-chamber ink-jet ink cartridge has been installed to print MICR-readable indicia by full color process printing, wherein the signal value generated by the printed indicia, as measured by ANSI specifications, is between 100 and 200, and wherein a MICR signal value, as measured by ANSI specifications, of less than 80 is generated by any one single pass during the full color process printing.

25. The ink-jet printing method of claim 24, wherein each filled chamber of the multiple-chamber ink-jet ink cartridge is charged with the same ink-jet ink.

26. The ink-jet printing method of claim 24, wherein all chambers of the multiple-chamber ink-jet ink cartridge are charged with MICR ink-jet ink.

27. The ink-jet printing method of claim 24, wherein all but one chamber of the multiple-chamber ink-jet ink cartridge are charged with MICR ink-jet ink.

28. The ink jet printing method of claim 27 wherein the one chamber of the multiple-chamber ink-jet ink cartridge is charged with non-MICR ink-jet ink.

29. The ink-jet printing method of claim 24 wherein the indicia is black.

30. The ink-jet printing method of claim 24 wherein the indicia is a color or colors other than black.

* * * * *